United States Patent Office 2,953,575
Patented Sept. 20, 1960

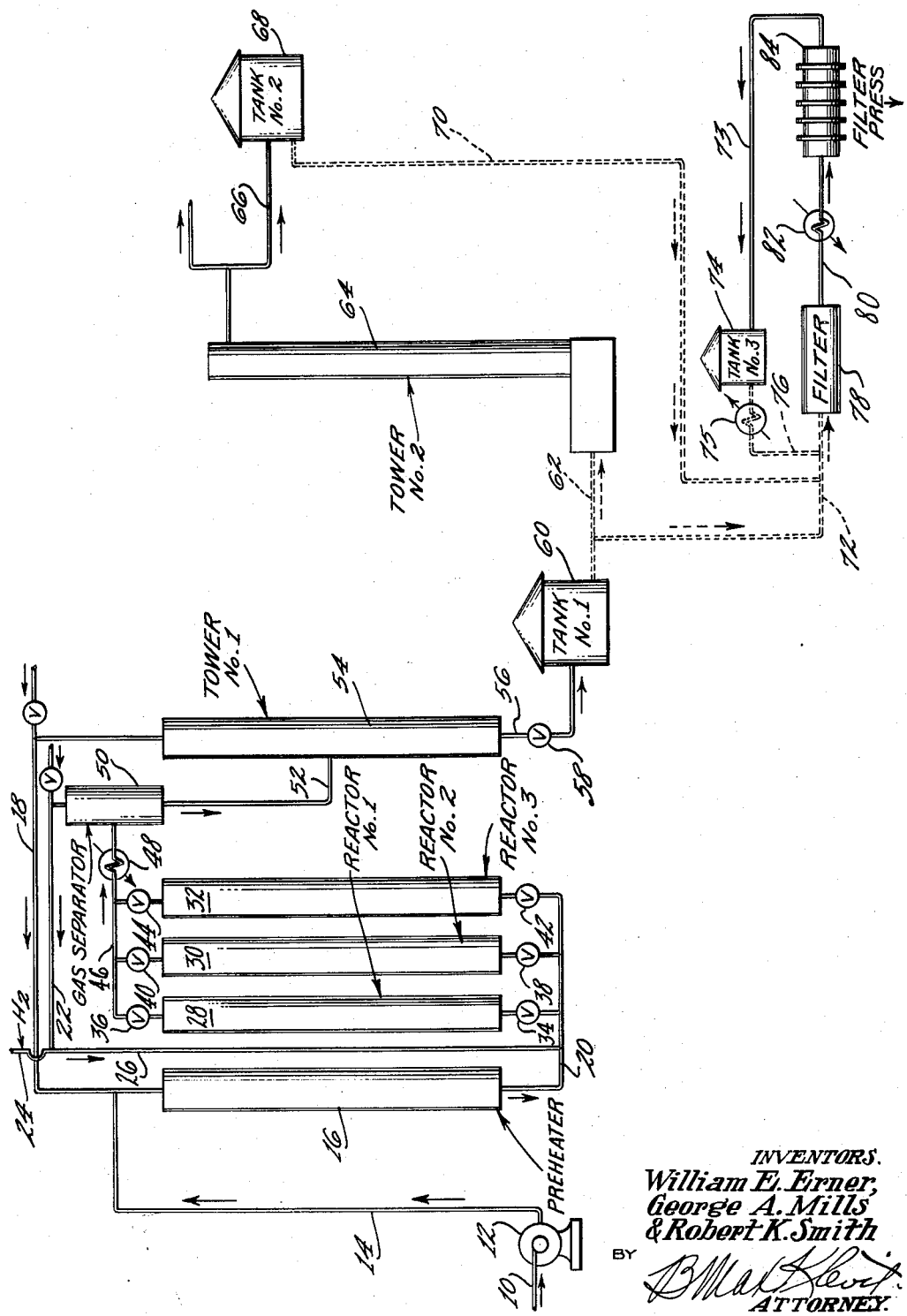

2,953,575

PREPARATION OF INDOLE

William E. Erner, Wilmington, Del., and George Alexander Mills, Swarthmore, and Robert K. Smith, Springfield, Pa., assignors to Houdry Process Corporation, Wilmington, Del., a corporation of Delaware Filed Nov. 8, 1955, Ser. No. 545,737

10 Claims. (Cl. 260—319)

The present invention relates to the preparation of heterocyclic organic nitrogen compounds, and is more specifically directed to a novel process for the preparation of indole from ortho ethyl aniline.

Indole has heretofore been prepared by the pyrogenic decomposition of various substances, particularly naturally-occurring nitrogenous materials, such as certain albumins. Indole has also been derived from the coal tar fraction having a boiling point range of 240° C. to 260° C.

More recently, the preparation of indole from ortho ethyl aniline through contact with various catalytic dehydrogenation catalysts has been suggested. While some degree of success has been attained by this catalytic method, it has certain serious drawbacks. Thus, prior catalytic methods require greatly elevated temperatures, such as temperatures within the range 550° C. to 750° C., and preferably temperatures within the range 625° C. to 675° C. Due to such greatly elevated temperatures large quantities of polyindoles and tars are formed.

An object of this invention is to provide a method for the dehydrocyclization of ortho alkyl anilines to produce indole and indole derivatives.

A further object of this invention is to provide an improved method for the synthesis of indole.

A still further object of the present invention is the provision of a catalytic synthetic method for making indole in which relatively low temperatures are employed.

Another object of the present invention is the provision of a catalytic method for synthesizing indole from ortho ethyl aniline in which relatively high yields of indole are secured, and in which appreciable amounts of polyindoles and tars and other undesirable by-products are avoided.

A further object of the present invention is the provision of a catalytic method for synthesizing indole in the presence of hydrogen, and in which appreciable amounts of polyindoles and tars and other undesirable by-products are avoided.

These and other objects are accomplished in accordance with the present invention in which an ortho alkyl aniline, such as ortho ethyl aniline, and hydrogen are contacted with a supported platinum or palladium catalyst, preferably a catalyst comprising an alumina support at a temperature of between 750° F. to 900° F., preferably about 850° F. The relative ratios of hydrogen to the ortho alkyl aniline should be from 1:1 to 20:1 mols of hydrogen per mol of ortho alkyl aniline, and preferably at least two mols of hydrogen per mol of ortho alkyl aniline, such as from 3:1 to 9:1 mols of hydrogen per mol of ortho alkyl aniline. Preferably, the catalytic conversion is effected at atmospheric pressure. Thus, it has been found in the case of ortho ethyl aniline that elevated pressures at the conversion temperatures favor the deamination of ortho ethyl aniline with resultant decreased yields of indole.

It has been found that the use of an active reduced supported platinum or palladium catalyst enables relatively low temperatures to be utilized in the preparation of indole from ortho ethyl aniline. The platinum or palladium should preferably be supported on alumina, although other neutral supports and slightly basic supports such as silica gel or magnesia may also be utilized. For the purposes of the present invention it is to be preferred that the catalyst be free or substantially free of acidic or halogen components. Thus, it has been found that the presence of acidic components favors polymer formation and lowers the overall initial yield of indole or indole derivatives.

A useful platinum catalyst for the present invention may be prepared by impregnating alumina or other neutral or basic support or even a slightly acidic support, such as silica alumina, with a dilute solution of chloroplatinic acid. The impregnated alumina is then dried and reduced by exposure to a hydrogen-containing gas. The resultant catalyst comprises a minor weight percentage, in the order of about 0.2 to 1.0%, of impregnated elemental platinum. A preferred embodiment of such catalyst comprises about 0.5 to about 1.0 weight percent platinum and has a surface area of about 80 square meters per gram prior to steaming.

The platinum-impregnated alumina obtained as aforesaid should then be steamed until the chloride content is very low or is absent. The inclusion of a steaming treatment is to be preferred in the preparation of catalyst used in the process of the present invention, since as heretofore noted, the catalyst should be at least substantially free of acidic or halogen components.

A useful palladium catalyst for the present invention may be prepared from an aqueous solution of palladium chloride in a similar fashion to the preparation of the aforesaid platinum catalyst. As with the preparation of the platinum catalyst, the removal of acidic or halogen components should preferably be effected.

The accompanying drawing illustrates a simplified and schematic flow sheet of a preferred embodiment of the subject invention, wherein the conversion of ortho ethyl aniline to indole is effected, it being understood, however, that this invention is not limited to the precise arrangement shown therein.

Referring to the accompanying drawing ortho ethyl aniline is introduced into the system through line 10 and is passed through pump 12 to line 14 wherein it is joined by liquid recycle from line 18.

This combined mixture is conveyed from line 14 through preheater 16 wherein it is heated to a temperature within the reaction temperature range of 750° F. to 900° F., preferably about 850° F.

The heated mixture is then passed to line 20, wherein it is joined by gas from line 26. Such gas comprises: recycle gas from line 22, which consists predominantly of hydrogen with minor amounts of ammonia and low molecular weight hydrocarbons; and fresh hydrogen from line 24.

The reactants are transferred from line 20 to reactors 28, 30 annd 32 at a space rate of 0.1 to 5.0 volumes of liquid per volume of catalyst per hour, and preferably 0.5 to 1.5 volumes of liquid per volume of catalyst per hour.

The volume of total gas to total vaporized hydrocarbon liquid charged to reactors 28, 30 and 32 should be maintained at a volume ratio of 1:1 to 20:1, and preferably at a volume ratio 3:1 to 9:1.

For a fourteen hour on-stream period, using a steamed platinum-alumina catalyst containing 0.5 weight percent platinum, an average yield of 29.5 weight percent may be obtained at atmospheric pressure, a mol ratio of hydrogen to ortho ethyl aniline of 6, a temperature of 840° F. to 910° F. and a space rate of between 0.75 to 1.5 volumes of liquid per volume of catalyst per hour. The average coke yield under these conditions will be 0.15 weight percent of the charge, and the catalyst deactivation* for the fourteen hour period will be 56.

In the illustrative embodiment, the combined feed in line 20 is preferably directed to two of the three reactors 28, 30 and 32, the third reactor being in the regeneration stage while the other two reactors are onstream. However, it is, of course, to be understood that other on-stream arrangements may be effected, and a large or smaller number of reactors may be utilized.

It is desirable to maintain the coke content at a predetermined level, such as below three weight percent based on the catalyst. This can be accomplished by the above-described three reactor system, in which two reactors are on-stream, and the third reactor is in the regeneration stage. Thus, shunting of the feed through any two of the reactors 28, 30 and 32 can be accomplished through respective valve pairs 34 and 36 for reactor 28, valve pairs 38 and 40 for reactor 30, and valve pairs 42 and 44 for reactor 32.

The regeneration of the platinum upon alumina catalyst, or palladium upon alumina catalyst within reactors 28, 30 and 32 may be effected by conventional oxidative coke removal procedures, as would include oxidation, purging and reduction steps. Such procedures are well known to the art, and for this reason will not be described herein. Similarly, for simplicity, the necessary line and valve arrangements to effect such regeneration are not shown in the accompanying flow sheet.

The effluent from the on-stream reactors is removed through line 46 and passed through condenser 48, wherein such effluent is cooled to a temperature at which condensation of the liquid constituents thereof is effected.

From condenser 48 the effluent in line 46 is passed to gas separator 50. In gas separator 50 the condensed liquid is separated from the gas, and the separated gas is recycled to the on-stream reactors through line 22. As heretofore indicated, the recycled gas from gas separator 50 comprises predominantly hydrogen with relatively small amounts of low molecular weight hydrocarbons and ammonia. The gaseous hydrocarbons and ammonia are present in line 22 due to decomposition and deamination of the ortho ethyl aniline during the reaction, and/or preheating stages.

While the ammonia may be scrubbed out of the recycled gas by contact with water, its presence in minor amounts in such gas may be desirable in order to facilitate the maintenance of the catalyst at a neutral or slightly basic pH level. Moreover, the recycling of minor amounts of ammonia aids in the suppression of the deamination of the ortho ethyl aniline.

From gas separator 50 the condensed reaction product is passed through line 52 to fractionation column 54. In fractionation column 54 the unreacted ortho ethyl aniline is taken overhead through line 18 and recycled to the system as liquid recycle by being passed into preheater 16 along with the fresh ortho ethyl aniline from line 14, as heretofore mentioned. Trace amounts of ethylbenzene and aniline may also be removed overhead from fractionation column 54, or if desired, cuts rich in ethylbenzene and aniline may be removed separately.

From fractionation column 54 the indole containing bottoms are passed through line 56 and valve 58 to storage tank 60. The indole may be supplied to users directly from storage tank 60, as the indole bottoms from fractionation column 54 may have a purity of as high as about 95%.

*Catalyst deactivation=$\left(1-\frac{\text{Final yield}}{\text{Initial yield}}\right)\times 100$ However, if desired, the indole may be purified, as by a variety of optional procedures. Thus, the indole may be passed from storage tank 60 through line 62 to distillation tower 64. From distillation tower 64 the indole may be taken overhead in high purity and transferred through line 66 to storage tank 68.

The distilled indole in storage tank 68 may be withdrawn as such, or may be further purified as by recrystallization in the following manner:

Indole from storage tank 68 may be passed from line 70 into line 72. In line 72 the indole from storage tank 68 may be joined with a suitable solvent or mother liquid from tank 74 and line 76. Examples of such solvents include water; or a mixed solvent of water and an organic material such as methanol; or an organic solvent such as isohexane.

The ratio of solvent to indole is such as to cause the indole to be dissolved within the solvent. The solution of dissolved indole and solvent is passed through filter 78 which may contain a filter bed of a suitable adsorbent, such as activated charcoal, alumina, basic clays, or other adsorbents which remove undesirable impurities but do not promote the polymerization of indole.

The filtered and impurity-free solution is passed from filter 78 through line 80 and heat exchanger 82, wherein the temperature of the filtered solution is lowered to a point at which the indole precipitates therefrom. The slurry of precipitated indole and mother liquor is passed through filter press 84 wherein the precipitated indole is removed on filter cloths. The filtered indole may be washed, if desired, with water to remove occluded mother liquor.

The motor liquor from filter press 84 may be recycled as through line 73, storage tank 74, and heat-exchanger 75 to line 76. Such mother liquor may be processed to recover solvent and additional indole as by distilling and cooling, and the like. The crude indole recovered from the mother liquor may, if desired, be reprocessed through reactors 28, 30 and 32 to accelerate the production of indole and suppress the formation of polyindoles.

While the process of the present invention has been illustrated for the preparation of indole from ortho ethyl aniline, the process of the present invention may be applied to the preparation of indole and indole derivatives from other ortho alkyl anilines.

Illustrative examples of various embodiments of the process of the present invention are set forth below:

*Example I*

0.5 mole of ortho ethyl aniline were contacted with a steamed platinum on alumina catalyst containing 0.5 weight percent platinum at a temperature of 730° F., a liquid hourly space velocity of 0.7, and a molar ratio of hydrogen to ortho ethyl aniline of 3 to 1.

A yield of indole of 0.195 mole was obtained. This equals a 39 weight percent yield.

*Example II*

Ortho ethyl aniline was contacted with a platinum catalyst similar to that employed in Example I at a temperature of between 815 to 895° F., a liquid hourly space velocity of 0.7, and a molar ratio of hydrogen to ortho ethyl aniline of 9 to 1.

An 87% liquid recovery was obtained, which upon disstillation yielded 54 weight percent indole having a melting point of 50° C. Recycling of the unconverted ortho ethyl aniline secured ultimate conversions thereof of about 90%.

*Example III*

Ortho diethyl aniline was contacted with a platinum catalyst similar to that employed in Example I at a temperature of 860° F., and a molar ratio of hydrogen to ortho diethyl aniline of 6 to 1.

7-ethyl-indole having a boiling point of 142° C. at 12 millimeters pressure, and a refractive index at 25° C. of 1.6050 was obtained.

*Example IV*

Ortho isopropyl aniline was contacted with a platinum catalyst similar to that employed in Example I at a temperature of 780 to 800° F., and a molar ratio of hydrogen to ortho isopropyl aniline of 6 to 1.

Spectrum analysis of the product revealed it to be a mixture of indole, 3-methyl indole, and 2-methyl indole.

When the catalyst was not steamed the yields of indole or its derivatives declined appreciably.

*Example V*

0.537 mole of N-methyl ortho toluidine were contacted with an unsteamed catalyst comprising 0.5 weight percent platinum on alumina at a temperature of 730° F., a liquid hourly space velocity of 0.82, and a molar ratio of hydrogen to N-methyl ortho toluidine of 1.64 to 1.

A mixture of indole and methyl indole equal to 18 mole percent was obtained.

*Example VI*

97.4 parts by weight of ortho ethyl aniline were contacted with the same type of catalyst as used in Example V at a temperature of 730° F., a liquid hourly space velocity of 0.8, and a molar ratio of hydrogen to ortho ethyl aniline of 2 to 1.

A 16 weight percent yield of indole was obtained.

The present invention may be embodied in other specific forms without departing from the spirit or essential attributes thereof and, accordingly, reference should be made to the appended claims, rather than to the foregoing specification as indicating the scope of the invention.

It is claimed:

1. The process for dehydrocyclizing of ortho alkyl aniline which comprises contacting such ortho alkyl aniline at a temperature between 750–900° F. and in the presence of at least one mol hydrogen, with a substantially halide-free non-acidic catalyst constituting a porous support impregnated with a minor amount of a metal selected from the group consisting of platinum and palladium.

2. A process in accordance with claim 1 in which the ortho alkyl aniline is ortho ethyl aniline.

3. A process in accordance with claim 1 in which the ortho alkyl aniline is ortho isopropyl aniline.

4. A process in accordance with claim 1 in which the ortho alkyl aniline is ortho diethyl aniline.

5. A process in accordance with claim 1 in which the ortho alkyl aniline is N-methyl ortho toluidine.

6. A process in accordance with claim 1 in which the hydrogen is present in a molar ratio of at least 2 mols of hydrogen per mol of ortho alkyl aniline.

7. A process for synthesizing indole which comprises contacting ortho ethyl aniline at a temperature of between about 750° F. to 900° F. with a non-acidic catalyst constituting a porous support impregnated with a minor amount of a metal selected from the group consisting of platinum and palladium, said catalyst being substantially free of halogen ions, and said contacting being affected in the presence of at least 1 mol of hydrogen per mol of ortho ethyl aniline.

8. A process for synthesizing indole which comprises contacting ortho ethyl aniline and at least an equal molar amount of hydrogen at a temperature of between about 750° F. to 900° F. with a non-acidic catalyst constituting a porous alumina support impregnated with a minor amount of a metal selected from the group consisting of platinum and palladium, said catalyst being substantially free of halogen ions.

9. A process for synthesizing indole which comprises contacting ortho ethyl aniline and at least an equal molar amount of hydrogen, at a temperature of between about 750° F. to 900° F. at a space rate of from 0.1 to 5.0 volumes of liquid per volume of catalyst per hour with a non-acidic catalyst constituting a porous support impregnated with a minor amount of a metal selected from the group consisting of platinum and palladium, said catalyst being substantially free of halogen ions.

10. A process for synthesizing indole which comprises contacting ortho ethyl aniline and from 3 to 9 molar volumes of hydrogen per molar volume of ortho ethyl aniline at a temperature of between about 750° F. to 950° F. and at substantially atmospheric pressure and a space rate of from 0.75 to 1.5 volumes of liquid per volume of catalyst per hour with a non-acidic catalyst constituting platinum impregnated on alumina, said catalyst being substantially free of halogen ions.

References Cited in the file of this patent

UNITED STATES PATENTS

| | | |
|---|---|---|
| 2,409,676 | Gresham et al. | Oct. 22, 1946 |
| 2,658,028 | Haensel et al. | Dec. 14, 1951 |
| 2,686,185 | Kreuz | Aug. 10, 1954 |
| 2,727,901 | Kreuz | Dec. 20, 1955 |

OTHER REFERENCES

Hettinger et al.: Ind. and Eng. Chem., vol 47 (1955), pp. 719–30.

Morgan et al.: Jour. Soc. Chem. Ind., vol. 57, pp. 358–60 (1938).

J. Am. Chem. Soc., 73:3080–3082 (1951).